(12) United States Patent
Hay et al.

(10) Patent No.: US 10,204,158 B2
(45) Date of Patent: Feb. 12, 2019

(54) AUDIO SUMMARIZATION OF MEETINGS DRIVEN BY USER PARTICIPATION

(71) Applicant: International Business Machines Corporation, Armonk, NY (US)

(72) Inventors: Alexander T. Hay, Orient, OH (US); Eugene K. Imbamba, Pataskala, OH (US); Terrence E. White, Cottage Grove, MN (US)

(73) Assignee: International Business Machines Corporation, Armonk, NY (US)

(*) Notice: Subject to any disclaimer, the term of this patent is extended or adjusted under 35 U.S.C. 154(b) by 360 days.

(21) Appl. No.: 15/076,820

(22) Filed: Mar. 22, 2016

(65) Prior Publication Data

US 2017/0277784 A1    Sep. 28, 2017

(51) Int. Cl.
| | | |
|---|---|---|
| G06F 7/00 | (2006.01) | |
| G06F 17/30 | (2006.01) | |
| H04L 29/06 | (2006.01) | |
| G10L 15/04 | (2013.01) | |
| G10L 15/26 | (2006.01) | |
| G10L 15/08 | (2006.01) | |
| G10L 15/18 | (2013.01) | |

(52) U.S. Cl.
CPC .. *G06F 17/30778* (2013.01); *G06F 17/30743* (2013.01); *G06F 17/30772* (2013.01); *G10L 15/04* (2013.01); *G10L 15/26* (2013.01); *H04L 65/403* (2013.01); *G10L 15/1822* (2013.01); *G10L 2015/088* (2013.01)

(58) Field of Classification Search
None
See application file for complete search history.

(56) References Cited

U.S. PATENT DOCUMENTS

| | | | |
|---|---|---|---|
| 6,687,671 B2 | 2/2004 | Gudorf et al. | |
| 7,756,923 B2 | 7/2010 | Caspi et al. | |
| 7,962,525 B2 * | 6/2011 | Kansal | G06F 17/30038 707/706 |
| 8,739,046 B2 | 5/2014 | Sloyer et al. | |
| 8,914,452 B2 | 12/2014 | Boston et al. | |
| 9,070,369 B2 * | 6/2015 | Cox | H04L 12/1822 |
| 2012/0166921 A1 * | 6/2012 | Alexandrov | G06F 17/212 715/202 |

(Continued)

FOREIGN PATENT DOCUMENTS

EP    1519343 A2    3/2005

OTHER PUBLICATIONS

Murray et al. "Extractive Summarization of Meeting Recordings" (2005). Proceedings of the 9th European Conference on Speech Communication and Technology. Edinburgh, Scotland. Four pages.

*Primary Examiner* — Tuan A Pham
(74) *Attorney, Agent, or Firm* — Stephen R. Yoder (57) ABSTRACT

A method for recording and summarizing a conference is provided. The method enables a conference leader to record and produce a detailed summary of the conference. The detailed summary contains hot links to various portions and/or segments of what was discussed in the conference. This summary also enables team members who are not able to attend the conference, or those who need a quick review of the topics covered at the conference, to survey key topics covered, and have the option to replay selected portions of the conference.

6 Claims, 5 Drawing Sheets

250

(56) References Cited

U.S. PATENT DOCUMENTS

| | | | |
|---|---|---|---|
| 2015/0142800 A1* | 5/2015 | Thapliyal | G06F 17/30719 707/737 |
| 2015/0348538 A1* | 12/2015 | Donaldson | G10L 15/08 704/235 |
| 2016/0269254 A1* | 9/2016 | Forney | H04L 43/067 |

* cited by examiner

```
<segmentLists>
                        ┌─405
    <segment1 audioLink="ftp://server.com/link1.mp3">
    Welcome to the What's Running Where (WRW) application.
    The goal of WRW is to track and manage business application
    to server associations across the Account...
    </segment1>                                           ─410
                    ┌─415
    <segment2 audioLink="ftp://server.com/link2.mp3">
    Nicholas Hawks moor, an English baroque architect and a
    protégé of architect Sir Christopher Wren, built six
    churches resulting from the 1711 Act of Parliament that...
    </segment2>                                          ─420
                    ┌─425
    <segment3 audioLink="ftp://server.com/link3.mp3"
relationshipLink="#segment1">
        George's Blooms-bury is his most idiosyncratic work,
435     marrying baroque splendor with classical references,
        and topped by the most eccentric steeple in London...
    </segment3>                                     ─430
</segmentLists>
```

```
<segmentSummaryLists>
        ╭─505
    <segmentSummary1 audioLink="ftp://server.com/link1.mp3">
    Summary of segment 1...
    </segmentSummary1>           510
                     ╭─515
    <segmentSummary2 audioLink="ftp://server.com/link2.mp3">
    Summary of segment 2..
    </segmentSummary2>           520
                     ╭─525
    <segmentSummary3 audioLink="ftp://server.com/link3.mp3">
    Summary of segment 3...
    </segmentSummary3>           530
</segmentSummaryLists>
```

AUDIO SUMMARIZATION OF MEETINGS DRIVEN BY USER PARTICIPATION

BACKGROUND

The present invention relates generally to the field of audio recordings of conferences, and more particularly to generating summary information for audio recordings.

Generally a conference involves an oral presentation or discussion of one or more topics with live and/or remote attendance of conference participants. Oftentimes, each conference participant may provide oral input during the conference. As a specific example that will be addressed throughout this disclosure, a conference call is one form of a conference. The term conference call refers to a telephone call by which a leader can speak with several callers, or participants, at the same time. A conference call may also allow callers to provide oral input during the call. Alternatively, some conference calls are set up such that they restrict callers to merely listen the spoken word of the leader.

One of the conference call features is to record a conference. A conference call may be recorded in any suitable audio format, which can be replayed later. It is known in the art for a conference call to be summarized to provide a brief overview of what is discussed in the conference call.

SUMMARY

In one aspect of the present invention, a method is provided comprising: monitoring a conference for a pre-determined phrase to be spoken by a conference member, the conference including an oral discussion by the conference member; recording the oral discussion for playback as a recorded discussion; responsive to detecting the pre-determined phrase, adding an index at a location in the recorded discussion corresponding to a time when the pre-determined phrase is detected; generating a keyword corresponding to the pre-determined phrase; and storing a summary of the conference including the recorded discussion, the index, and a listing of the keyword.

DETAILED DESCRIPTION

A method for recording and summarizing a conference is provided. The method enables a conference leader to record and produce a detailed summary of the conference. The detailed summary contains hot links to various portions and/or segments of what was discussed in the conference. This summary also enables team members who are not able to attend the conference, or those who need a quick review of the topics covered at the conference, to survey key topics covered, and have the option to replay selected portions of the conference. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, random access memory (RAM), read-only memory (ROM), erasable programmable read-only memory (EPROM or Flash memory), static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions, or acts, or carry out combinations of special purpose hardware and computer instructions.

Figure 1:
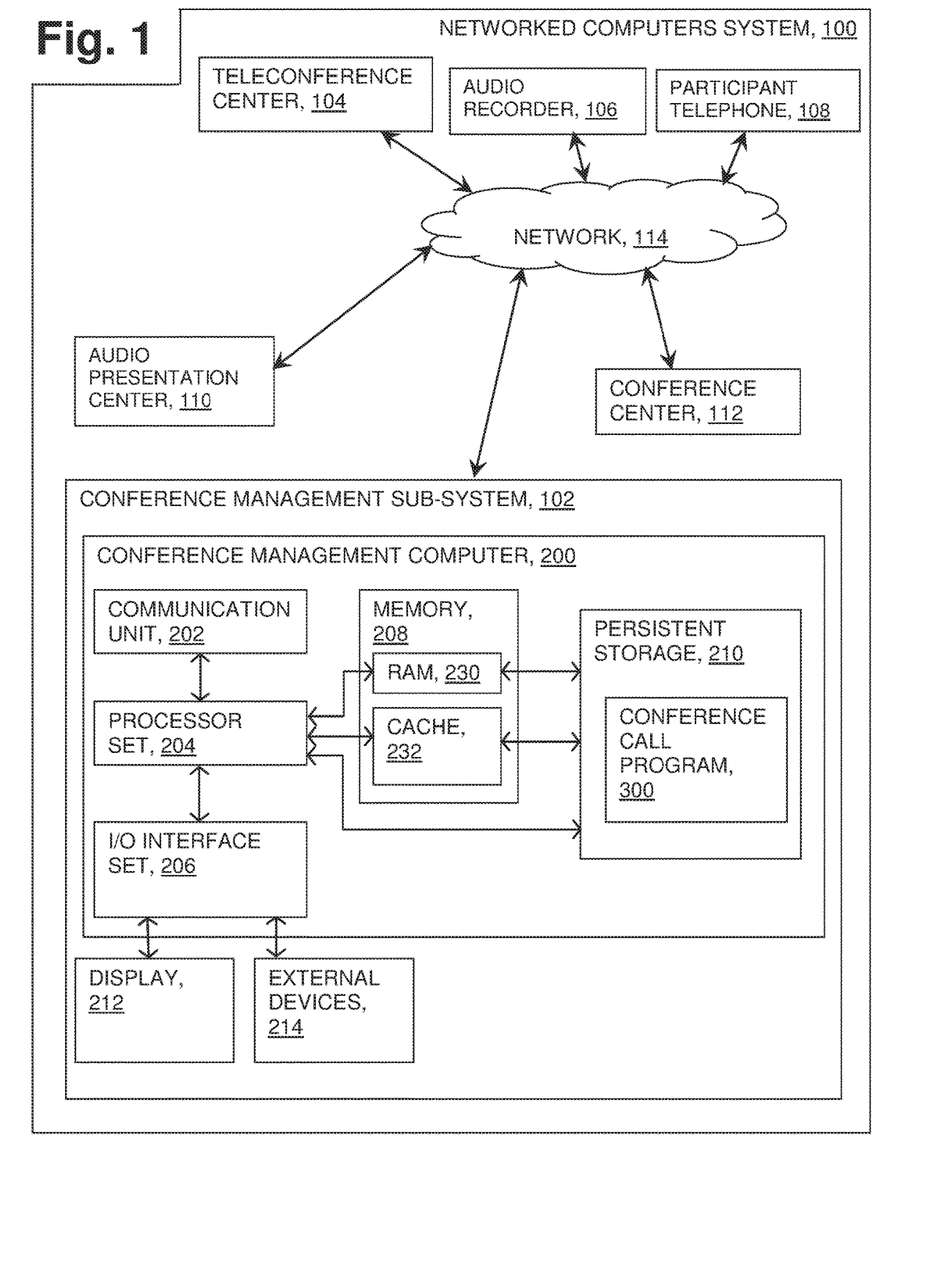
FIG. 1 is a schematic view of a first embodiment of a system according to the present invention.

The present invention will now be described in detail with reference to the Figures. FIG. 1 is a functional block diagram illustrating various portions of networked computers system 100, in accordance with one embodiment of the present invention, including: conference management sub-system 102; teleconference center sub-system 104; audio recorder sub-system 106; participant telephone sub-system 108; audio presentation center sub-system 110; conference center sub-system 112; communication network 114; conference management computer 200; communication unit 202; processor set 204; input/output (I/O) interface set 206; memory device 208; persistent storage device 210; display device 212; external device set 214; random access memory (RAM) devices 230; cache memory device 232; and conference call program 300.

Sub-systems 104, 106, 108, 110 and 112 may be a laptop computer, tablet computer, netbook computer, personal computer (PC), a desktop computer, a personal digital assistant (PDA), a smart phone, or any programmable electronic device capable of communicating with the conference management sub-systems 102 via network 114.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Alternatively, a portion of program 300 may be stored in sub-systems 104, 106, 108, 110 and 112. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

In some embodiments of the present invention, a method is provided for recording and summarizing a conference call meeting. The recording of the conference call meeting is automatically divided into a plurality of audio segments based on transitional phrases spoken by participants of the conference call. In addition to the plurality of audio segments, the summary includes links to the plurality of audio segments and further includes a plurality of text segments that are converted from the corresponding audio segments of the plurality of audio segments. While the discussion below relates extensively to conference call environments, it will be understood by a person of skill in the art that numerous other orally presented conferences may be audio recorded and organized according to embodiments of the present invention.

Figure 3:
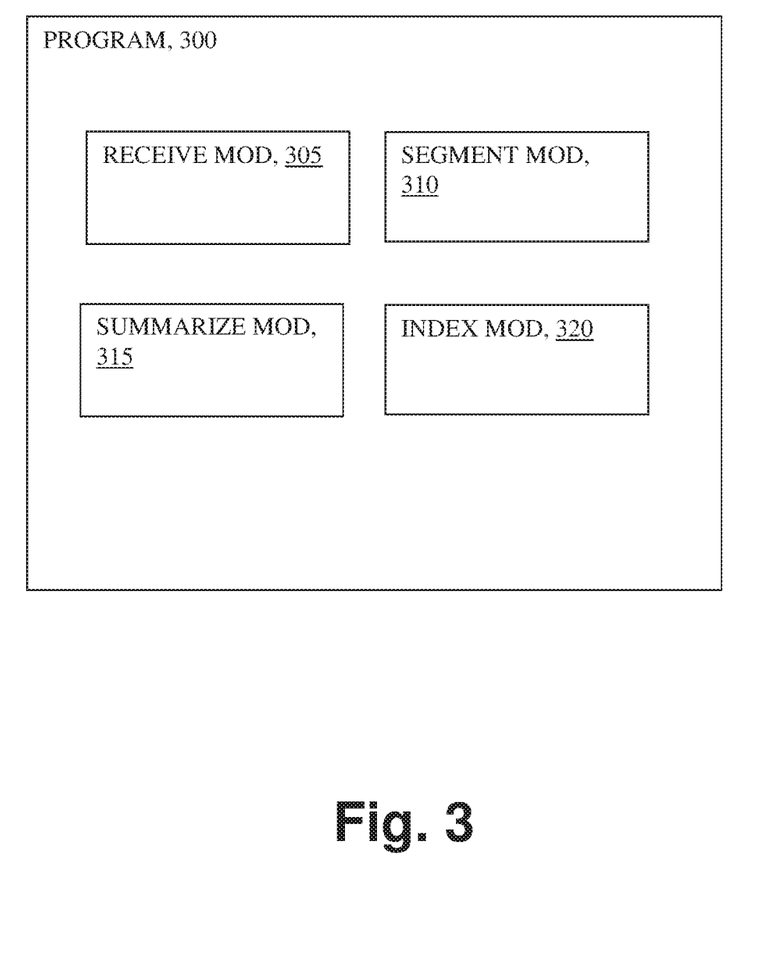
FIG. 3 is a schematic view of a machine logic (for example, software) portion of the system depicted in FIG. 1.

Conference call program 300 operates to automatically record and summarize a conference call meeting. Program 300 allows participants of the conference call meeting to speak key "natural language" transitional phrase to drive the summary generation. Further program 300 produces links to various portions and/or segments of what is discussed in the conference call meeting, allowing for a quick review of and playing back of interesting segments of the conference call. Other similar programs are envisioned that may represent some or all of the recording and summarizing software of conference management computer 200. Similar programs include software specifically directed to oral presentations and others directed specifically to live discussions where no telephone equipment is used, but only audio recording equipment, such as audio recorder 106.

Some embodiments of the present invention recognize the following facts, potential problems and/or potential areas for improvement with respect to the current state of the art: (i) current technology for note-taking, recording, and summarizing minutes for a conference call needs improvement; (ii) conventional technology lacks the high fidelity of a conference call or other state of the art oral presentation systems; (iii) no topical or context analysis is provided in conventional solutions; and/or (iv) conventional solutions produce whole audio recordings with no visual summary of topical content.

Various conventional approaches have been used to record and summarize a conference call. These approaches generally place the entire task of summarizing the conversation covered in the conference call on algorithms themselves. While many advances in artificial intelligence have made such approaches feasible, these approaches generally deliver inadequate results.

Some embodiments of the present invention augment a full summarization of the conference meeting by recognizing topical context, incorporating verbal transition cues from participant(s), and/or including audio links. This increases the accuracy and overall usability of the entire output for both reference and archival purposes.

Some embodiments of the present invention summarize a conference call meeting in real-time and extract a broader set of topics and context through which related conversations can be derived, improving the overall quality of the conference call summary.

Further, some embodiments of the present invention enable monitoring and summarization of a conference call meeting in multiple formats, not just in electronic format, such as a written transcript that may include, for example, an executive summary that is automatically generated according to some embodiments of the present invention. Additionally, the full context of the conference call meeting is analyzed and a method to generate and incorporate text and audio segments into the meeting summary are provided.

Figure 2:
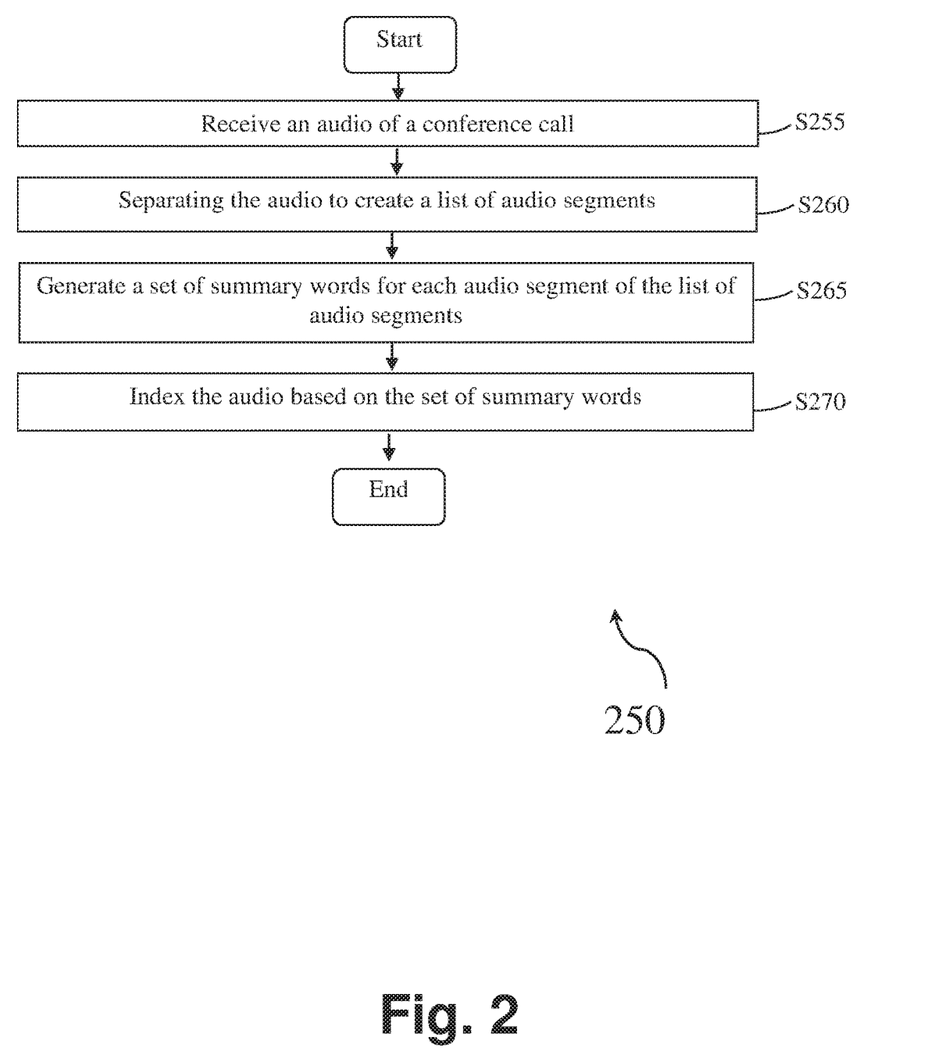
FIG. 2 is a flowchart depicting an embodiment of a method that may be performed, at least in part, by the system depicted in FIG. 1.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where receive module ("mod") 305 receives the audio of a conference call. In this example, a department leader schedules a conference call to discuss various topics with their department. Since the department members are spread across the world, the department leader expects that many of the department members will not join the conference call. The department leader decides to record the conference call so that anyone who misses the call will have access to the replay. Since this conference call is expected to last a long time and many important topics will be covered, the department leader decides to produce a summary to go along with the replay such that the department members could get a quick overview of the key topics discussed on the call, and optionally replay the discussions that are most relevant to them. At this step, the department leader initiates the conference call by, for example, dialing into the conference line. Once the conference call starts, the department leader enters the appropriate digits to initiate the audio recording by using program 300. After the recording is started, the meeting dialog can begin. The first topic of conversation is now being recorded.

Processing proceeds to step S260, where segment module 310 separates the audio to create a list of audio segments. In this step, program 300 begins to listen for and identify a transitional phrase to be spoken by the conference leader (i.e., the department leader). This will occur when the conference leader wants to move the discussion onto a next topic. Some examples of transitional phrases of "natural language" spoken by the conference leader include, but are not limited to: " . . . and now onto our next topic . . . ," " . . . let's move on . . . ," " . . . our next agenda item is . . . ." Thus, topic creation is supported by the use of natural language processing.

In some embodiments of the present invention, some standard transitional phrases are predefined and preloaded into program 300. Alternatively, transitional phrases are customized by an individual conference leader. This may be completed before the conference call is initiated. For example, prior to the call, the department leader decides which transitional phrases he wants to use in order to transition the discussion from one topic to a next topic. Based on their normal speech patterns, the department leader may select the following transitional phrases: (i) "and now, let's move on to;" (ii) "and now for our next topic;" (iii) "now we will discuss;" and/or (iv) "our next topic is." The department leader then loads these phrases into the program 300 on conference management computer 200 in FIG. 1 and starts the conference call.

Further, in this step, once a transitional phrase is spoken, the audio file (e.g., mp3 file) for the first segment is ended, and the recording for a next audio segment is initiated. This step may repeat until the conference call ends and a list of audio segments is created. Additionally this step makes a decision where the program 300 needs to determine if the dialog/conference call is ending. The program 300 knows that the dialog is over when the conference call itself ends. Once the conference leader ends the call, the audio recording ends.

Figure 4:
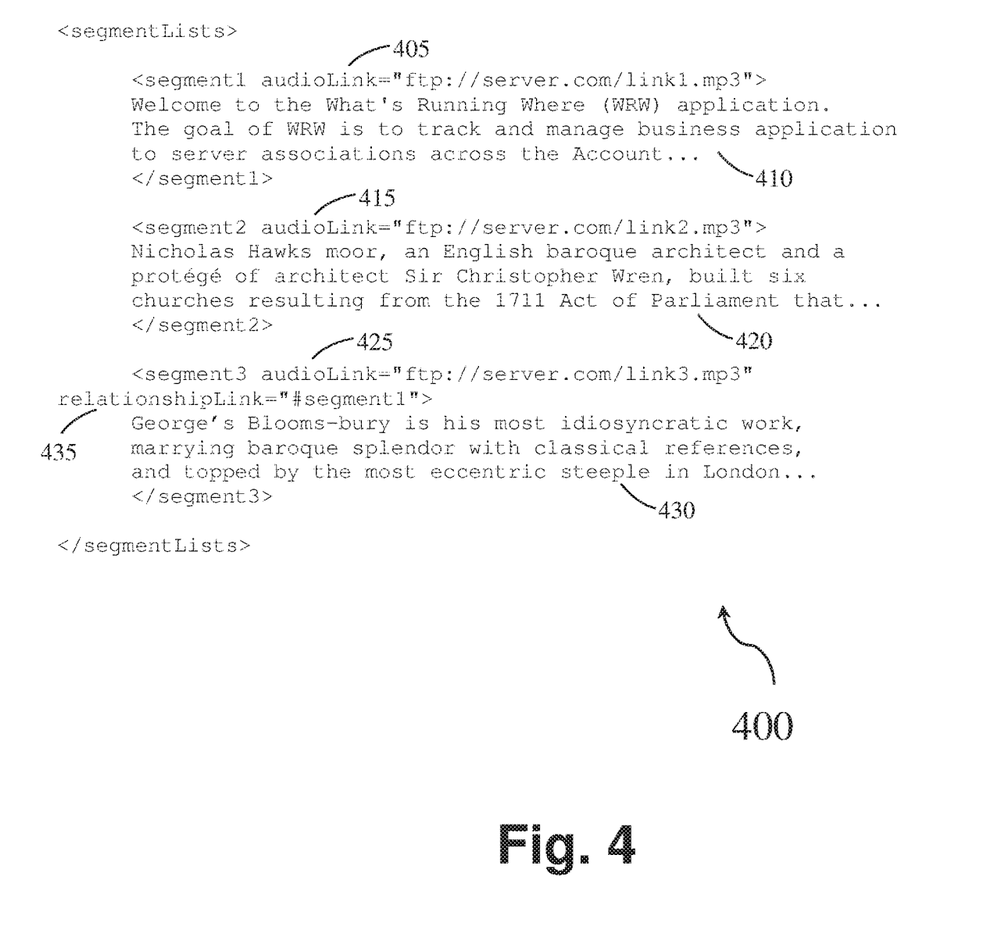
FIG. 4 shows an example text segment list according to an embodiment of the present invention.

Processing proceeds to step S265, where summarize module 315 generates a set of summary words for each audio segment of the list of audio segments. Once the list of audio segments is generated in step S260, each individual audio file/segment of the list of audio segments is converted to a corresponding text file/segment. The audio files are associated with the corresponding text files. FIG. 4 shows an example segment list 400. List 400 includes text segments 410, 420, and 430 which are converted from the corresponding audio segments, and links 405, 415, and 425 to the corresponding audio segments. In some embodiments of the present invention, the audio segment can be converted to a text segment using an available approach like a "Speech to Text" functionality.

Figure 5:
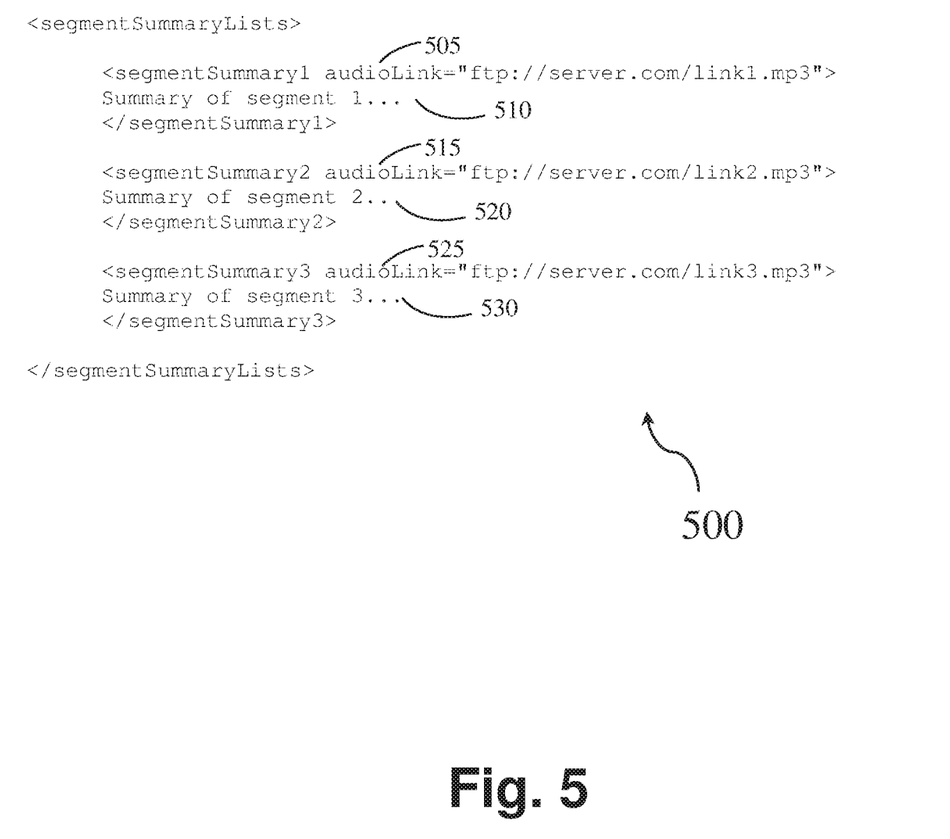
FIG. 5 shows an example summary word list according to an embodiment of the present invention.

In this step, for each audio segment in the list of audio segments, a list of commonly occurring words is generated that serve to summarize each audio segment. In some embodiments of the present invention, the common technique of "tag cloud" generation is leveraged to generate the word list, and is not dependent on any one tag cloud algorithm. This list of summary words is used to help a user/team member to quickly identify the core subject matter of each segment. This summary word list allows the user to hone in on the audio segments that piques their interest without having to review each audio segment. FIG. 5 shows an example summary word list 500. List 400 includes summary segments 510, 520, and 530 which are a set of summary words for the corresponding audio segments, and links 505, 515, and 525 to the corresponding audio segments.

Some embodiments of the present invention further include, in this step, scanning the text segment of each audio segment and making comparisons to determine if topics are discussed between each audio segment. That is, the same topic is examined to see if the topic is discussed in more than one audio segment. For example, the topic of "Pay Raises" may have been covered in audio segment one, but if it is revisited in audio segment five, then a relationship link is generated to associate audio segments one and five (audio segment one and audio segment 5 are referred to as related audio segments), so that anyone who needs to review this topic can easily find those related segments. The relationship link is inserted into the text/audio segment list to allow for easy navigation between the related segments. An example relationship link 435 is shown in FIG. 4 where audio segments one and three are identified as related segments.

In some embodiments of the present invention, the list of summary words is added to the audio segment list for each corresponding audio segment, such that a completed list of audio segments is generated.

Processing proceeds to stop at step S270, where index module 320 indexes the audio segments based on the set of summary words. After the conference call, all of the invited attendees receive an indexed summary of the conference call along with links to the segmented audio for replay. For example, the conference leader accesses conference management computer 200 from one of sub-systems 104, 106, 108, 110 and 112 (FIG. 1) and sends out the indexed summary. Accordingly, the invited attendees may retrieve one or more audio segments by accessing conference management computer 200 from one or more of sub-systems 104, 106, 108, 110 and 112. Such indexing allows the invited attendees to quickly decide on which portion/segment of the conference call they want to review. Once the attendees make a selection, they can access the details in the corresponding audio/text segment.

Some embodiments of the present invention may include one, or more, of the following features, characteristics and/or advantages: (i) quality of a conference call summary is improved; (ii) consumability of the output of recording and summarizing a conference call is improved; (iii) appropriate deep dives into the original discussion of a conference call is available to the user; (iv) a quick review of the topics covered in a conference call is available; and/or (v) a replay of selected portions of the discussion covered in a conference call is provided.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   monitoring a conference for a set of phrases to be spoken into a microphone by a conference member, the set of phrases having respectively corresponding triggers defined before the conference occurs;
   recording to an audio file a first audio segment of the conference for playback as a recorded discussion, the start of the first audio segment being identified by a first phrase of the set of phrases;
   responsive to detecting a second phrase of the set of phrases, stopping the recording of the first audio segment, and recording to the audio file a second audio segment of the conference, the second phrase being a transitional phrase;
   generating, by a processor, a first keyword corresponding to the first audio segment of the conference;
   determining, by the processor, two keywords including the first keyword of the first audio segment and a second keyword of another audio segment of the audio file are related;
   generating a selectable list of audio segments recorded to the audio file including the first audio segment and the second audio segment, the selectable list including segment links to the audio segments of the audio file;
   generating a relationship link in the selectable list for the first audio segment and the second audio segment based on the two keywords being related;
   identifying, by the processor, a set of related audio segments in the audio file based, at least in part, on a context of the related audio segments;
   generating a listing of the set of related audio segments including a start time corresponding to each of the related audio segments, the start time being with respect to a playback duration of each related audio segment;
   storing, to a storage device, a summary of the conference including the audio file, the selectable list of audio segments, and a listing of keywords corresponding to audio segments in the audio file including the first keyword and the second keyword; and
   converting, by the processor, the summary of the conference into a text transcript including the listing of keywords and a corresponding location of the audio segments.

2. The method of claim 1, wherein the text transcript includes a selectable link to a location of an audio segment.

3. A computer program product comprising a non-transitory computer readable storage medium having a set of instructions stored therein which, when executed by a processor, causes the processor to summarize a conference by:
   monitoring a conference for a set of phrases to be spoken by a conference member, the set of phrases having respectively corresponding triggers defined before the conference occurs;
   recording to an audio file a first audio segment of the conference for playback as a recorded discussion, the start of the first audio segment being identified by a first phrase of the set of phrases;
   responsive to detecting a second phrase of the set of phrases, stopping the recording of the first audio segment, and recording to the audio file a second audio segment of the conference, the second phrase being a transitional phrase;
   generating a first keyword corresponding to the first audio segment of the conference;
   determining two keywords including the first keyword of the first audio segment and a second keyword of another audio segment of the audio file are related;
   generating a selectable list of audio segments recorded to the audio file including the first audio segment and the second audio segment, the selectable list including segment links to the audio segments of the audio file;
   generating a relationship link in the selectable list for the first audio segment and the second audio segment based on the two keywords being related;
   identifying a set of related audio segments in the audio file based, at least in part, on a context of the related audio segments;
   generating a listing of the set of related audio segments including a start time corresponding to each of the related audio segments, the start time being with respect to a playback duration of each related audio segment;
   storing a summary of the conference including the audio file, the selectable list of audio segments, and a listing of keywords corresponding to audio segments in the audio file including the first keyword and the second keyword; and
   converting the summary of the conference into a text transcript including the listing of keywords and a corresponding location of the audio segments.

4. The computer program product of claim 3, wherein the text transcript includes a selectable link to a location of an audio segment.

5. A computer system comprising:
   a processor set; and
   a computer readable storage medium;
   wherein:
   the processor set is structured, located, connected, and/or programmed to run program instructions stored on the computer readable storage medium; and
   the program instructions which, when executed by the processor set, cause the processor set to summarize a conference by:

monitoring a conference for a set of phrases to be spoken by a conference member, the set of phrases having respectively corresponding triggers defined before the conference occurs;

recording to an audio file a first audio segment of the conference for playback as a recorded discussion, the start of the first audio segment being identified by a first phrase of the set of phrases;

responsive to detecting a second phrase of the set of phrases, stopping the recording of the first audio segment, and recording to the audio file a second audio segment of the conference, the second phrase being a transitional phrase;

generating a first keyword corresponding to the first audio segment of the conference;

determining two keywords including the first keyword of the first audio segment and a second keyword of another audio segment of the audio file are related;

generating a selectable list of audio segments recorded to the audio file including the first audio segment and the second audio segment, the selectable list including segment links to the audio segments of the audio file;

generating a relationship link in the selectable list for the first audio segment and the second audio segment based on the two keywords being related;

identifying a set of related audio segments in the audio file based, at least in part, on a context of the related audio segments;

generating a listing of the set of related audio segments including a start time corresponding to each of the related audio segments, the start time being with respect to a playback duration of each related audio segment;

storing a summary of the conference including the audio file, the selectable list of audio segments, and a listing of keywords corresponding to audio segments in the audio file including the first keyword and the second keyword; and converting the summary of the conference into a text transcript including the listing of keywords and a corresponding location of the audio segments.

6. The computer system of claim 5, wherein the text transcript includes a selectable link to a location of an audio segment.

* * * * *